Dec. 22, 1964   G. GREMIGNI   3,161,934
MACHINE FOR INJECTION MOLDING HOLLOW ARTICLES FROM A MOIST
MIXTURE OF FIBERS AND HYDRAULIC BINDER
Filed May 23, 1962   4 Sheets-Sheet 4
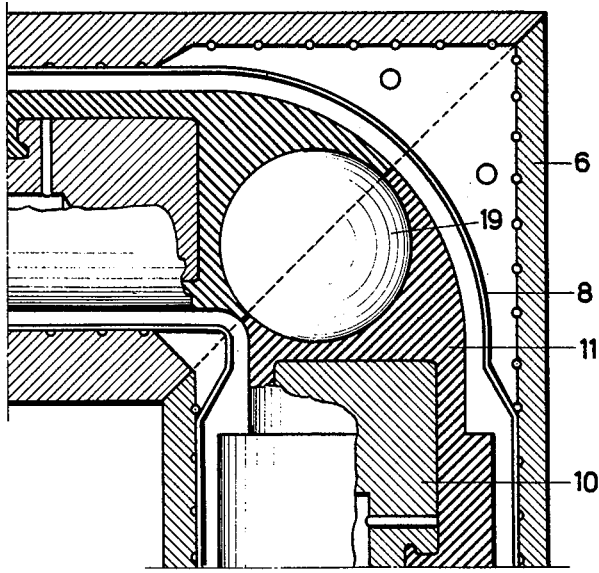
Fig.7
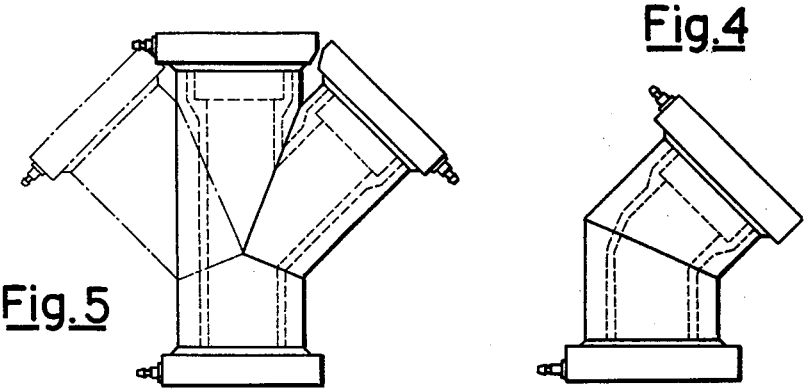
Fig.4
Fig.5
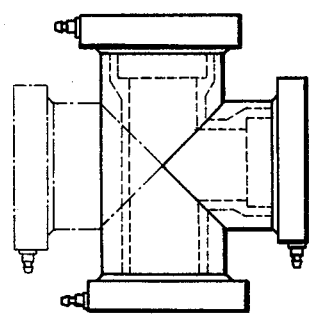
Fig.6

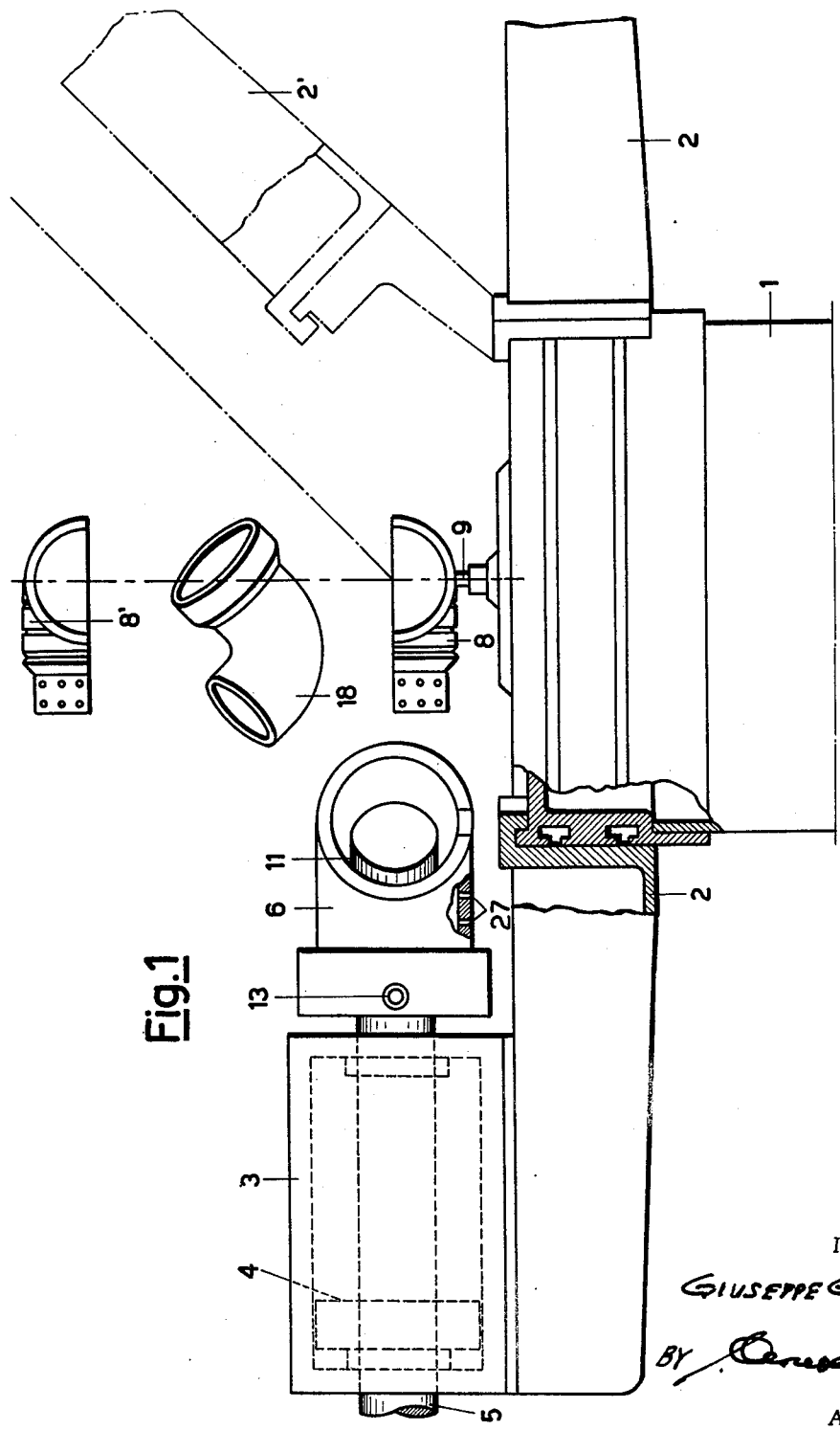

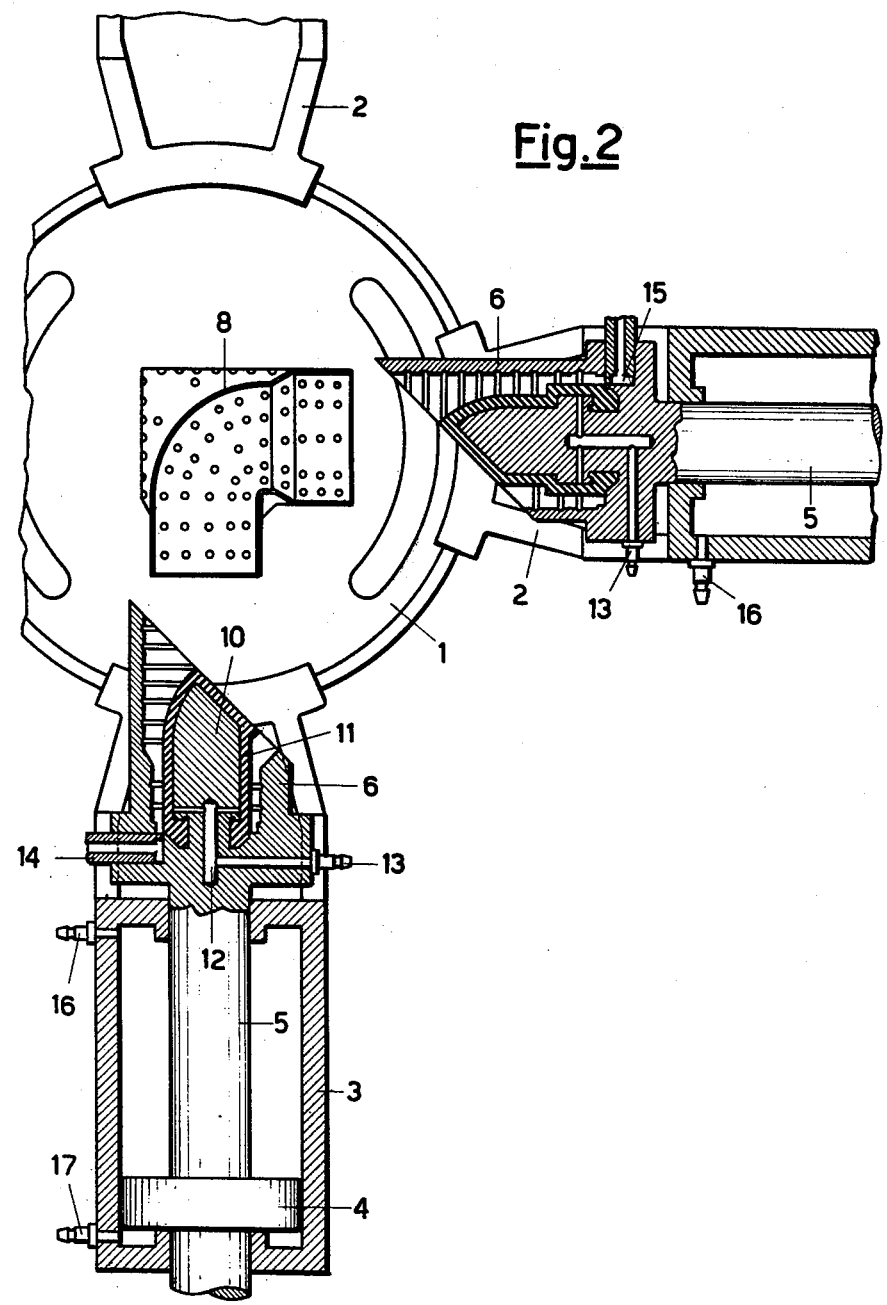

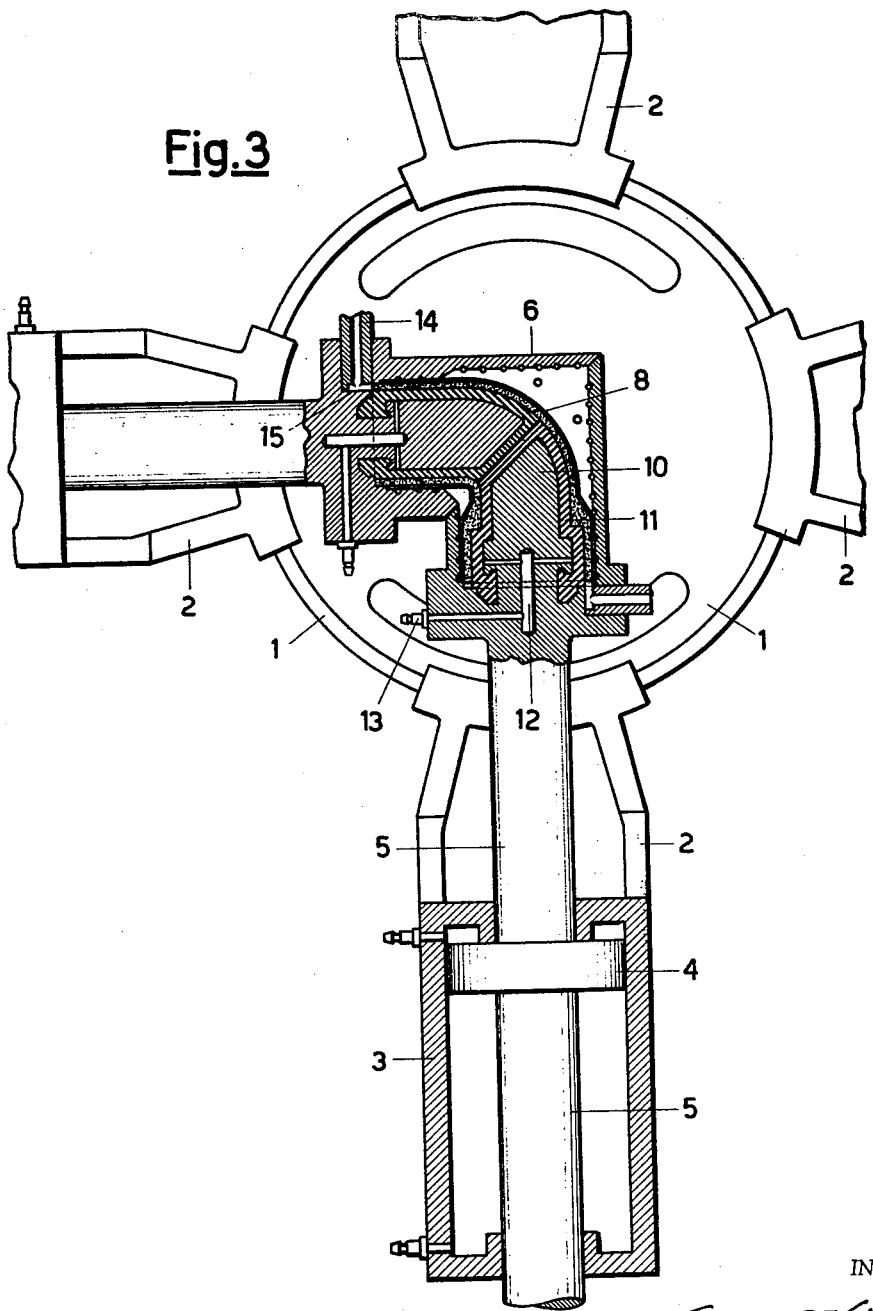

United States Patent Office 3,161,934
Patented Dec. 22, 1964

3,161,934
MACHINE FOR INJECTION MOLDING HOLLOW ARTICLES FROM A MOIST MIXTURE OF FIBERS AND HYDRAULIC BINDER
Giuseppe Gremigni, Milan, Italy, assignor to Societe Anonyme Francaise Eternit, Paris, France, a company of France
Filed May 23, 1962, Ser. No. 197,039
Claims priority, application France, May 26, 1961, 863,052, Patent 1,291,221
5 Claims. (Cl. 25—30)

Hollow articles have already been produced from a moist mixture of a fibrous material and cement or other hydraulic binder, such mixture being injected into the space or cavity defined between a pervious tubular mold and a cylindrical core coaxial with the mold and carrying an elastic and water-impervious sheath or envelope which is inflated after the injection of the moist mixture into the mold cavity, so as to express moisture from the mixture.

No problem exists in removing the core when molding hollow articles in the manner described above so long as the core is cylindrical or conical and has a substantially rectilinear axis.

Hollow articles having a plurality of communicating pipe sections with angularly related intersecting axes have already been obtained with suitably shaped molds and inflatable cores incorporating a number of independent parts, each having a substantially rectilinear axis, by introducing between the inflatable core and the mold, a paste-like mixture of fibers and cement having a sufficiently thick consistency and a comparatively low water content, so that it is possible to inflate the several sections of the core without the mixture oozing between them. However, molding with a core made of several sections could not be used readily when it was desired to use a mixture which was originally in the condition of fluidity required for its introduction into the mold cavity by injection.

This invention has for its object to provide a machine for the injection molding from a liquid mixture of fibers and hydraulic binder of hollow articles having a plurality of communicating pipe sections, the axes of which are angularly related and intersect.

According to my invention, a machine for the injection molding of hollow articles of the described character, has its core formed in several sections which are mounted for axial sliding movement into and out of the corresponding tubular sections of the mold and which have inner ends lying in planes angularly related to the axes of the respective core sections and engageable with each other when the core sections are axially inserted in the mold, and pressure-fluid actuated means are provided to simultaneously urge the core sections axially into the mold and thereby effect fluid-tight engagement of the inner ends of the core sections with each other.

Since the inner ends of the core sections are held strongly together, the material injected cannot ooze or infiltrate into the gaps between the different sections forming the core and it is possible to produce hollow articles with perfectly smooth and crestless internal surfaces.

Furthermore, since the machine embodying this invention permits the injection of the moist mixture into the ends of all the sections of the mold simultaneously, it is possible to employ a mixture having a higher viscosity, that is, including a relatively smaller excess of water, which is of advantage by reason of the higher mechanical properties obtained for the final product since a more complete removal of said excess of water is thus made possible.

The above, and other objects, features and advantages of the invention, will be apparent in the following detailed description of embodiments of my invention, illustrated by way of example in the accompanying drawings wherein:

FIG. 1 is a partly exploded, side elevational view of a machine embodying this invention, and which is shown partly broken away and in section, FIGS. 2 and 3 are horizontal partly sectional plan views of the machine in its open and closed positions, FIGS. 4, 5 and 6 diagrammatically illustrate modifications for molding hollow articles of various shapes, and FIG. 7 is a detail sectional view showing a modification of the mold.

The machine illustrated in FIGS. 1 to 3 includes a cylindrical pedestal 1 having a circular track at its upper end from which a number of supports 2 extend radially outward in directions that are angularly adjustable.

Each support 2 carries a cylinder 3 adapted to be shifted radially with reference to the vertical axis of the pedestal 1 and to be locked in the desired position; and the axes of the cylinders 3 all pass through a common point of the axis of the pedestal 1.

In each of the cylinders 3 there is an axially movable piston 4 having a rod 5 which projects inwardly and carries a tubular member 6. The member 6 has an inner transversely grooved surface which is coaxial with the cylinder 3.

The tubular members 6 have mating oblique transverse inner ends which, when the pistons 4 are moved toward the inner ends of the cylinders, extend across the axis of the pedestal 1, as illustrated in FIG. 3, and lie in planes which register with one another.

The upper surface of the pedestal 1 carries an upstanding rod 9 which, in turn, supports one half 8 of a mold constituted by a perforated metal plate reinforced externally with perforated ribs.

The other or upper half 8' of the mold is similar to, and mates with the lower half 8 from which it is separable along a horizontal plane containing the axes of cylinders 3.

When the upper half 8' of the mold is fitted on the lower half 8, the complete mold thus obtained has an outer shape which permits the mold to fit, with negligible clearance, inside the hollow chambers formed by the tubular members 6 when the latter have their inner end edges engaging each other, as illustrated in FIG. 3. Consequently, the two halves of the mold are then held against each other by the members 6.

The rod 5 of each piston 4 carries, inside the tubular member 6, a core section 10 covered by a rubber or other elastic sheath 11, and channels or passages 12 extend through section 10 and open at the surface of the latter within sheath 11 and also at the outside, as at 13.

The inner ends of the rubber sheaths 11 enclosing the core sections 10 are angularly related to the axes of the latter and thus lie in the same plane when the two tubular members 6 engage each other as illustrated in FIG. 3.

The outer surface of the rubber sheath 11 is substantially smooth or at any rate any projections thereon are sufficiently small-sized for them to collapse during removal of the core section from the mold.

A transverse pipe 14 is connected to the outer end of each tubular member 6 and is free to revolve around its axis in the bearing formed for it. When it is turned to the position illustrated in FIG. 2, the lateral opening 15 of the pipe 14 is closed, whereas when the pipe 14 is turned to the position illustrated in FIG. 3, its opening 15 communicates with the mold cavity defined between the perforated mold 8–8' held inside the tubular member 6 and the elastic sheaths 11 of the core sections.

Each cylinder 3 has nipples 16 and 17 opening into the opposite ends of the cylinder and adapted to be connected to pipes or hoses (not shown) by which a fluid under pressure is fed to, and exhausted from the cylinder 3 for actuation of the piston 4.

The above described machine operates as follows:

Starting with the parts in the position illustrated in FIG. 2, the upper half 8' of the mold is first fitted over the lower half 8 and, upon introduction of compressed fluid into the cylinders through the nipples 17 thereof, the two pistons 4 are moved inwardly and urge the two tubular members 6 into contact with each other.

The mold 8-8' is thus enclosed in the chamber defined by the tubular members 6 while the inner ends of the rubber sheaths 11 are urged against each other.

The pipes 14 are then turned about their axes so as to cause their openings 15 to register with the cavity of the mold.

The pipes 14 are connected with a container or other source (not shown) of desired mixture to be molded. Such mixture is subjected to a suitable pressure, as by a pump (not shown), and enters the mold and fills the space left between the wall of the latter and the rubber sheaths 11. During this stage corresponding to the injection of the mixture, a fraction of the water of the mixture passes out of the mold, through its perforations and follows the grooves formed in the inner wall surfaces of the tubular members 6, so as to be exhausted outwardly through the ports 27 (FIG. 1).

At this moment, the pipes 14 are turned again so as to close the ports or openings 15, and a compressed fluid is supplied to the channels 12, through the connections 13, so as to inflate the elastic walls of the sheaths 11, which compress the mixture inside the mold and expel a large amount of the excess water contained in the mixture. The tubular shape of the members 6 permits this operation of expressing the water to be performed under very high pressures.

Then the supplying of compressed fluid to the connections 13 is interrupted to reduce the pressure inside each sheath 11, so that the latter shrinks again and collapses over the corresponding rigid core section 10. Since the collapsed sheath 11 has a generally smooth outer surface, as already referred to, it may be removed from within the molded part by urging it axially outward together with the related tubular member 6. Such movement of the members 6 is obtained by introducing compressed fluid into the cylinders 3 through the nipples 16. This being done, the part 8' of the mold is raised and the molded part 18 illustrated in FIG. 1 is lifted out of the lower part 8 of the mold.

With the described machine, it is possible to use a very fluid mixture for injection since the excess water may be subsequently removed. The introduction of the mixture through the two ends of the mold allows the mixture to uniformly fill the entire mold cavity.

The two rigid sections 10 of the core are urged against each other, and act as a single core. When the shaping and compression of the molded article are finished, these rigid sections of the core may be removed speedily and easily. It is thus possible to produce hollow or tubular articles including any number of pipe sections having angularly related intersecting axes.

FIGS. 4, 5 and 6 diagrammatically illustrate different examples of the arrangement of the tubular members 6 for producing hollow articles of various configurations. Of course, in each case the supports 2 are adjustably arranged on the pedestal 1 to cause the tubular members 6 to extend in the different directions required.

The supports 2 may also be located in different planes. For example, one of the supports may be positioned as illustrated at 2' in FIG. 1, so as to provide molded hollow articles including pipe sections the axes of which are not all coplanar.

It is also to be noted that the inner ends of the rubber sheaths 11 may be interconnected through a hard rubber sphere 19 as illustrated in FIG. 7 or through any other suitable means adapted to provide an intimate contact between said inner ends or heads.

Although several embodiments of the invention have been described in detail herein with reference to the accompanying drawings, it is to be understood that the invention is not limited to those precise embodiments, and that various changes and modifications can be effected therein by one skilled in the art without departing from the scope or spirit of the invention, except as defined in the appended claims.

I claim:

1. A machine for molding a hollow article having a plurality of communicating pipe sections with angularly related intersecting axes from a moist mixture of fibers and a hydraulic binder, comprising a mold including two mating parts with permeable walls corresponding in shape to that of the article to be produced and including a plurality of communicating, outwardly opening tubular sections with intersecting axes having the same angular relationship as the axes of the pipe sections of the article, said two parts of the mold meeting, and being separable along planes passing through said axes of the tubular sections thereof, a plurality of core sections corresponding to said tubular sections of the mold and each including a rigid, substantially cylindrical member and an elastic water-impervious sheath enveloping said rigid member, said core sections being slidable coaxially into and out of the corresponding tubular sections of the mold through the open outer ends of the latter, said core sections having inner ends which are engageable with each other in planes that are angular related to the respective axes of the core sections when the latter are axially inserted in the corresponding tubular sections of the mold, means mounting said core sections for rectilinear axial movements in the directions of said axes of the corresponding tubular sections of the mold so as to permit insertion and withdrawal of the core sections, fluid-pressure actuated means operative to simultaneously urge said core sections axially into the corresponding tubular sections of the mold, thereby to effect fluid tight engagement of said ends of the core sections within the mold, means for introducing the moist mixture between said permeable walls of the mold and the elastic sheaths of the core sections, and means for introducing a fluid under pressure between said rigid members of the core sections and said sheaths of the latter, thereby to mold the mixture to the shape of said permeable walls and express moisture from the mixture through said permeable walls.

2. A machine as in claim 1; wherein said means mounting each of the core sections includes a support movable axially with the latter and engageable with the open outer end of the corresponding tubular section of the mold when the core section is inserted therein, thereby to close the corresponding tubular section of the mold.

3. A machine as in claim 2; wherein said support for each of the core sections includes a tubular extension coaxial with the related core section and shaped to extend around the corresponding tubular section of the mold when the core section is inserted in the latter for holding together said two parts of the mold, said tubular extensions of the supports for the core sections having mating inner ends for fluid-tight engagement with each other around the mold, when said core sections are inserted in the latter.

4. A machine as in claim 3; wherein said means for introducing the moist mixture and said means for introducing a fluid under pressure both include conduit means extending through said support for each of the core sections.

5. A machine as in claim 1; further comprising a pedestal having circular guide means thereon, and means mounting said mold on said pedestal with the intersection of said axes of the tubular sections of the mold being concentric with said circular guide means; and wherein said means mounting the core sections include members movable along said circular guide means with the axes of the respective core sections extending radially with respect to the center of the circular guide means, thereby to permit adjustment of the angular relationship of the axes of the core sections for producing articles having pipe sections with different angular relationships between their intersecting axes.

References Cited in the file of this patent

UNITED STATES PATENTS

| | | |
|---|---|---|
| 2,311,358 | Baily | Feb. 16, 1943 |
| 2,802,404 | Taylor | Aug. 13, 1957 |
| 2,865,079 | Marchioli et al. | Dec. 23, 1958 |
| 2,878,727 | Groot | Mar. 24, 1959 |
| 2,961,043 | Hicks | Nov. 22, 1960 |
| 2,983,021 | Maillard | May 9, 1961 |
| 3,031,365 | Marchioli et al. | Apr. 24, 1962 |

FOREIGN PATENTS

| | | |
|---|---|---|
| 530,837 | Belgium | Aug. 14, 1954 |
| 803,056 | Great Britain | Oct. 15, 1958 |